United States Patent
Wojack et al.

(10) Patent No.: US 7,921,553 B2
(45) Date of Patent: Apr. 12, 2011

(54) METHOD OF MAKING A CUSTOMIZED WIRELESS COMMUNICATION DEVICE

(75) Inventors: Jason P. Wojack, Libertyville, IL (US); William P. Alberth, Prairie Grove, IL (US); Joseph L. Allore, Mundelein, IL (US); Gary R. Weiss, Buffalo Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

(21) Appl. No.: 12/534,959

(22) Filed: Aug. 4, 2009

(65) Prior Publication Data

US 2010/0076583 A1    Mar. 25, 2010

Related U.S. Application Data

(60) Provisional application No. 61/100,051, filed on Sep. 25, 2008.

(51) Int. Cl.
H05K 3/30 (2006.01)
(52) U.S. Cl. .......... 29/832; 29/840; 343/700 R; 455/566
(58) Field of Classification Search .............. 29/825, 29/832, 840; 343/700 R; 455/566
See application file for complete search history.

(56) References Cited

U.S. PATENT DOCUMENTS

| | | | |
|---|---|---|---|
| 6,097,339 A * | 8/2000 | Filipovic et al. | .......... 343/702 |
| 6,806,835 B2 | 10/2004 | Iwai et al. | |
| 6,861,989 B2 | 3/2005 | Morningstar et al. | |
| 6,924,769 B2 | 8/2005 | Ito et al. | |
| 7,091,911 B2 | 8/2006 | Qi et al. | |
| 7,200,009 B2 | 4/2007 | Narhi et al. | |
| 7,233,885 B1 | 6/2007 | Larabee et al. | |
| 2001/0038616 A1 | 11/2001 | Fong et al. | |
| 2002/0057289 A1 | 5/2002 | Crawford et al. | |
| 2003/0036367 A1 | 2/2003 | Fuhrmann et al. | |
| 2003/0179143 A1 | 9/2003 | Iwai et al. | |
| 2004/0217472 A1 * | 11/2004 | Aisenbrey et al. | .......... 257/734 |
| 2004/0222924 A1 * | 11/2004 | Dean et al. | .......... 343/700 MS |
| 2005/0032558 A1 | 2/2005 | Chen | |

(Continued)

FOREIGN PATENT DOCUMENTS

GB    2422920 A    9/2005

(Continued)

OTHER PUBLICATIONS

M, Dong Sung: "The International Search Report and The Written Opinion of the International Search Authority", Korean Intellectual Property Office, Daejeon, Republic of Korea, completed:Apr. 12, 2010, mailed: Apr. 13, 2010; all pages.

(Continued)

Primary Examiner — C. J Arbes
(74) Attorney, Agent, or Firm — Gary J. Cunningham

(57) ABSTRACT

A method of making a customized wireless communication device (100) is disclosed. It can include the steps of: inputting (110) customer requirements; generating (120) a checklist of customer requirements; providing (130) an extruded housing with an opening defining a pocket configured to receive electrical components; and removing (140) material from the extruded housing to form an industrial design having at least one receptacle integral to the extruded housing to receive an antenna module and display module. The method is adapted to allow a designer to customize the look and feel of an electronic device, such as wireless communication device. This method is attractive to a customer.

29 Claims, 6 Drawing Sheets

U.S. PATENT DOCUMENTS

| | | | |
|---|---|---|---|
| 2005/0101356 A1* | 5/2005 | Hutchison | 455/566 |
| 2006/0214857 A1 | 9/2006 | Ollikainen | |
| 2007/0236870 A1 | 10/2007 | Hachino et al. | |
| 2008/0167087 A1* | 7/2008 | Tang et al. | 455/569.1 |

FOREIGN PATENT DOCUMENTS

| | | | |
|---|---|---|---|
| KR | 1020060068244 A | 6/2006 | |
| KR | 100787563 B1 | 12/2007 | |
| WO | 2005125158 A1 | 12/2005 | |

OTHER PUBLICATIONS

Motorola, Inc.: "Continuous Housing with Integral Antenna" Specification, U.S. Appl. No. 12/534,957, filed Aug. 4, 2009.

Lee, Saang Woong: "The International Search Report and The Written Opinion of the International Search Authority", Korean Intellectual Property Office, Daejeon, Republic of Korea, completed: Mar. 8, 2010, mailed: Mar. 9, 2010, all pages.

* cited by examiner

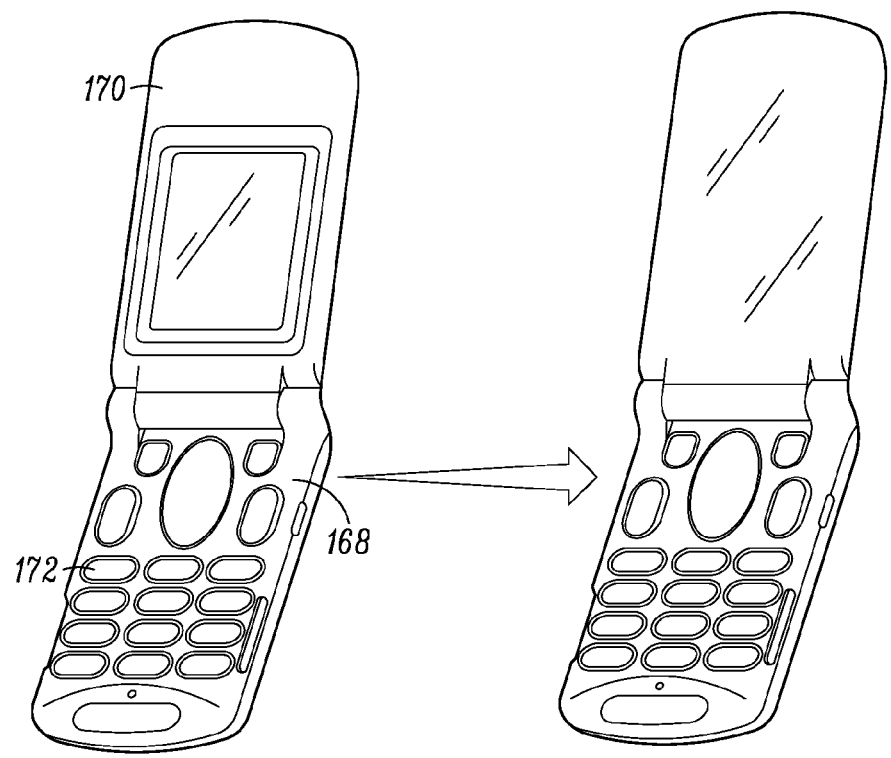
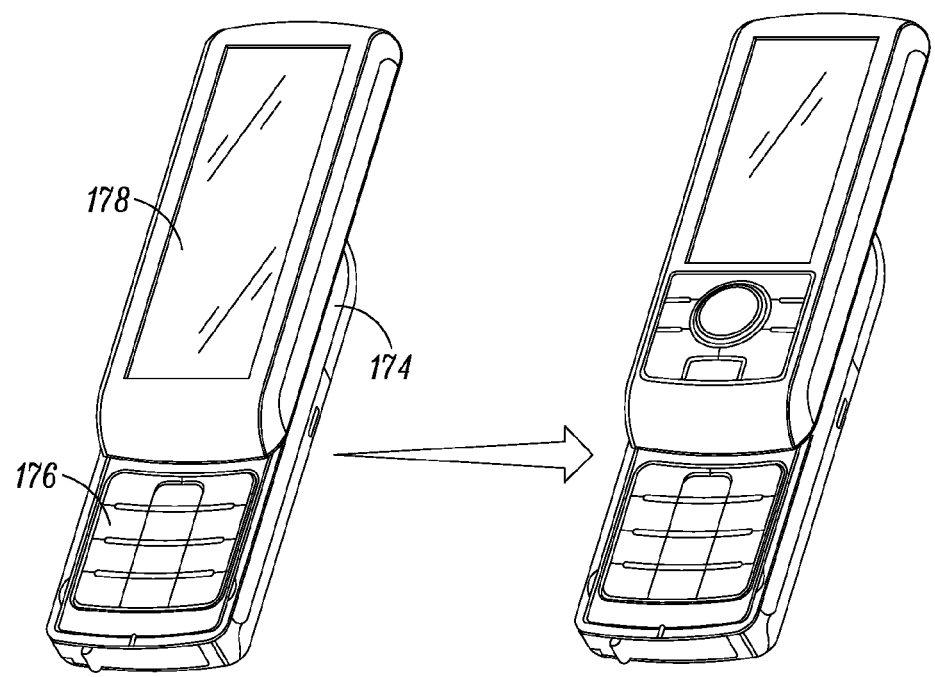
FIG. 5

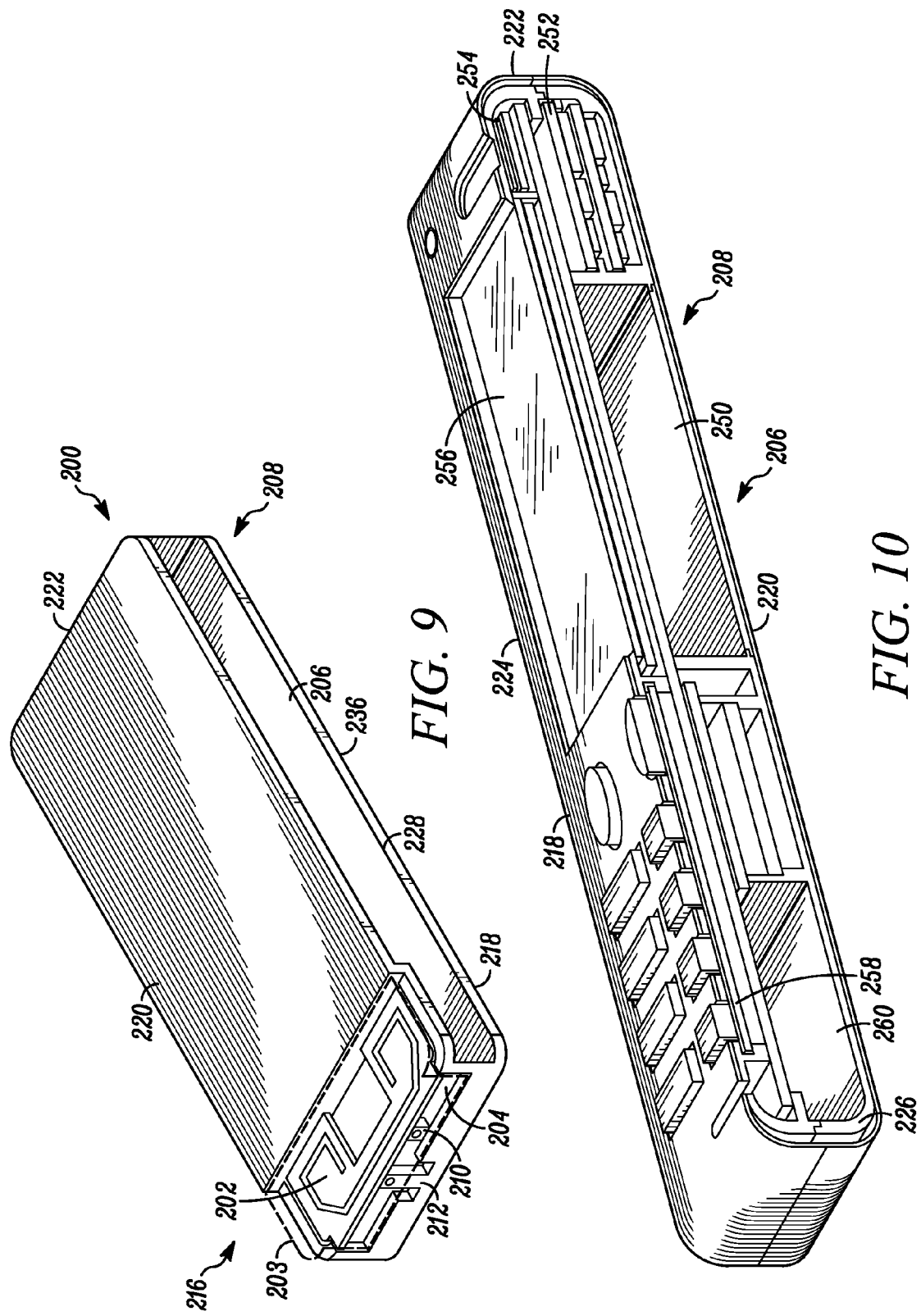

a
METHOD OF MAKING A CUSTOMIZED WIRELESS COMMUNICATION DEVICE

FIELD OF THE INVENTION

The present invention relates generally to methods of manufacturing electronic devices, and more particularly, to a method of making a customized wireless communication device.

BACKGROUND OF THE INVENTION

Electronic devices generally have a housing and electronic components contained therein. Some devices have multiple housing pieces coupled together while others are a single housing. Electronic components can include an antenna for RF communication. Antennas in these devices are coupled to a printed circuit board (PCB).

It is desirable to allow customers and designers, to design, sculpt and customize, the "industrial design" or look and feel of an electronic device, such as wireless communication device, while also being cost effective.

There is a further need to provide a platform of customizable electronic devices, such as wireless communication devices, that allow a designer with several design options, while maintaining certain dimensions and antenna RF characteristics which are in compliance with FCC specifications domestically and their equivalent non-domestically, and that are connectable or couplable with additional modular components, such as displays, antennas, key pads and the like.

A simple and robust way of making a customized wireless communication device, by a designer, within FCC compliance and the equivalent non-domestically, and which is configured for mass production, simplified manufacturability and structural integrity, would be beneficial.

BRIEF DESCRIPTION OF THE DRAWINGS

FIG. 5 is a perspective view of two additional exemplary phone designs, including a flip style phone with an external display and odd shaped keys and a slider type phone with an external display keys and rectangular keys, in accordance with an embodiment of the invention.

FIG. 9 is a perspective view from the rear of an extruded housing with an antenna module, in the form of an integral antenna and in phantom an antenna module shown in the form of a drop-in antenna complementarily configured to be received in the housing, in accordance with an embodiment of the invention.

FIG. 10 is a frontal perspective cut-away view of an extruded housing with keys, display and an antenna module, showing an antenna cover and side door forming a wireless communication device, in accordance with an embodiment of the invention.

DETAILED DESCRIPTION OF THE DRAWINGS

Figure 1:
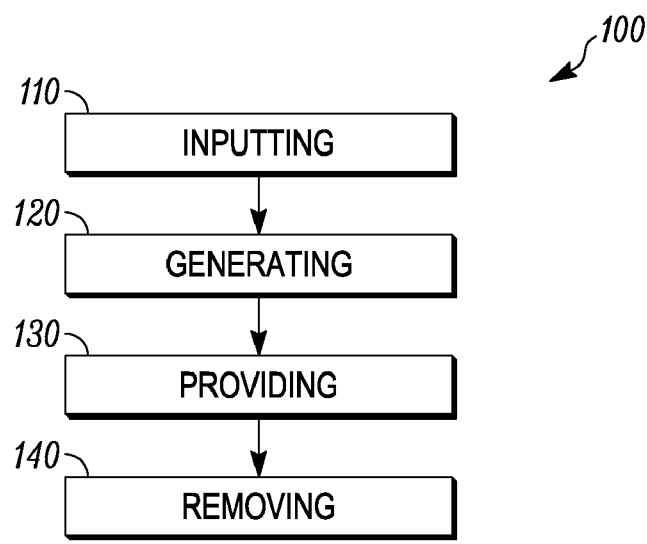
FIG. 1 is a simplified block diagram of making a customized wireless communication device, in accordance with an embodiment of the invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Before describing in detail embodiments that are in accordance with the present invention, it should be observed that the present invention resides primarily in apparatus components and combinations of method steps related to the housing and integral user interface. Accordingly, the apparatus components and method steps have been represented where appropriate by conventional symbols in the drawings, showing only those specific details that are pertinent to understanding the present invention, so as not to obscure the disclosure with details that will be readily apparent to those of ordinary skill in the art, having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In its simplest form, a method of making a customized wireless communication device 100 is shown in FIG. 1. It can include the steps of: inputting 110 customer requirements; generating 120 a checklist of customer requirements; providing 130 an extruded housing with an opening defining a pocket configured to receive electrical components; and removing 140 material from the extruded housing to form an industrial design having at least one receptacle integral to the extruded housing to receive an antenna module and display module.

Advantageously, this method and arrangement is adapted to allow a customer-designer to design and customize the look and feel or industrial design of his or her electronic device, such as wireless communication device. The ability to customize the industrial design of a wireless communication device is beneficial, desirable, intriguing and attractive to a customer-designer.

In addition, advantageously, the method can provide an electronic device with pre-tested and pre-qualified tolerances, dimensions, geometries and RF characteristics, which are in compliance with FCC specifications domestically and their equivalent non-domestically, to provide a designer with a pleasant industrial design experience and user experience.

As used herein, the terms "customer" and "designer" are used interchangeably and include their common and ordinary meaning.

In more detail, a customer can specify or choose, as a customer requirement, for example, hardware features such as the exterior or external design including, length, width and depth, corners and sidewalls being square or semi-circular, surface structure being smooth or with waves, rough or non-linear, type of display, such as touch screen or not, size of display, antenna module construction, keypad construction with specified key geometries such as square, circular, oblong and the like, color, etc. for a desired custom wireless communication device. Stated differently, a designer can sculpt the overall look and feel of a wireless communication device. Likewise, the customer can specify electronic related features, such as software, RF requirements and the like.

Figure 4:
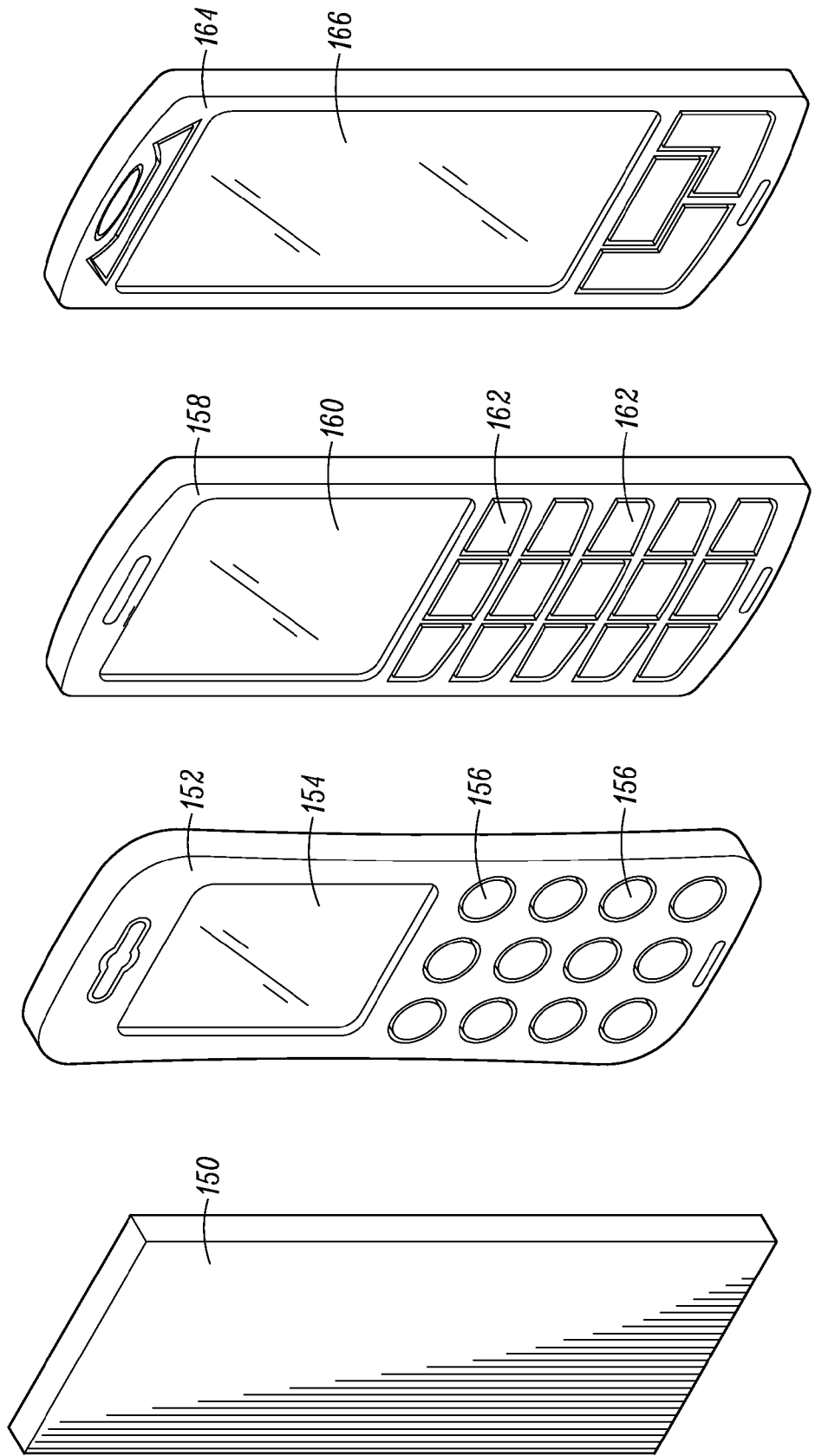
FIG. 4 is a perspective view of a spliced narrow profile extrusion and three exemplary phone designs, including a peanut shape with a display and circular keys, rectangular shape with display and rectangular keys and a multimedia phone with a large touch screen display, in accordance with an embodiment of the invention.

Referring to FIG. 4 and in more detail, an unfinished extruded housing 150 and three exemplary narrow-profile phone designs are shown, including: a peanut shape 152 with a display 154 and circular keys 156, a rectangular shape 158 with mid-sized display 160 and rectangular keys 162; and a multimedia phone 164 with a large touch screen display 166.

In FIG. 5, perspective views of additional exemplary phone designs are shown, including: a flip style phone 168 with an external display 170 and odd shaped keys 172; and a slider type phone 174 with integrated rectangular keys 176 and an external display. Each is shown finished on the right.

Figure 2:
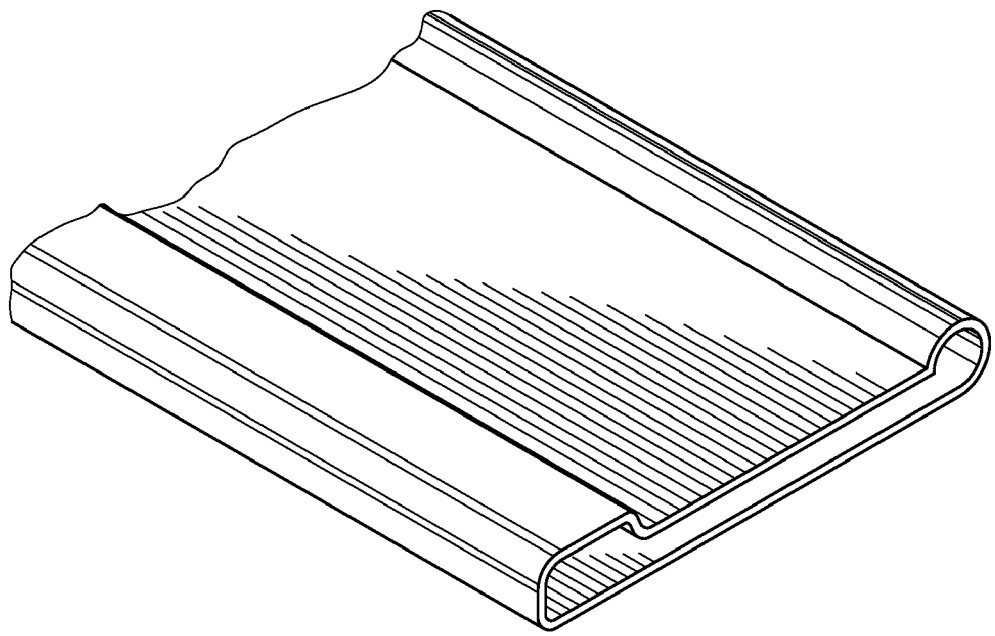
FIG. 2 is a perspective view of two narrow profile extrusions, with an opening configured to receiving electronic components, the one on the right has additional material on either side for contouring, in accordance with an embodiment of the invention.
Figure 3:
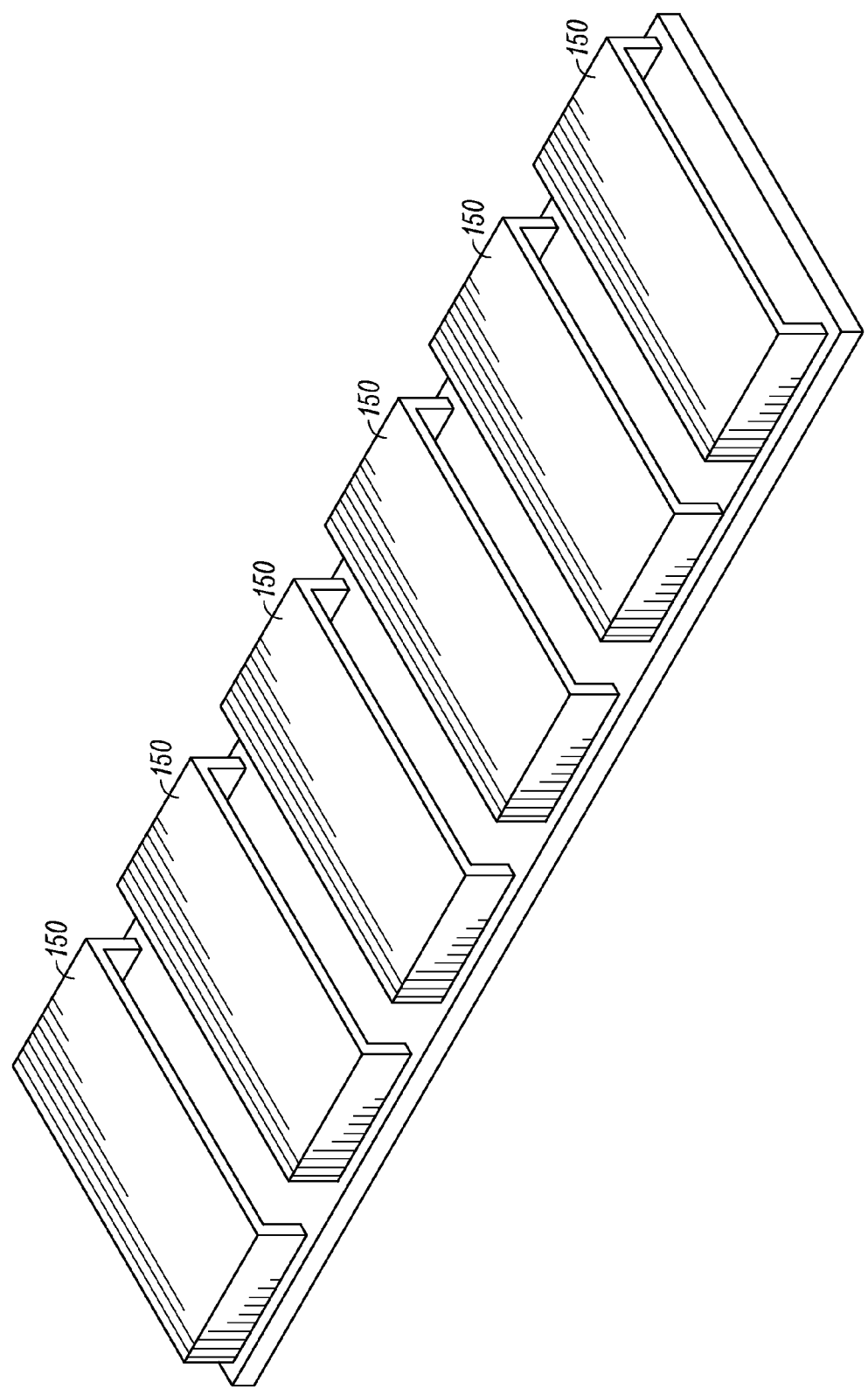
FIG. 3 is a perspective view of a plurality of spliced narrow profile extrusions from FIG. 2, in accordance with an embodiment of the invention.
Figure 6:
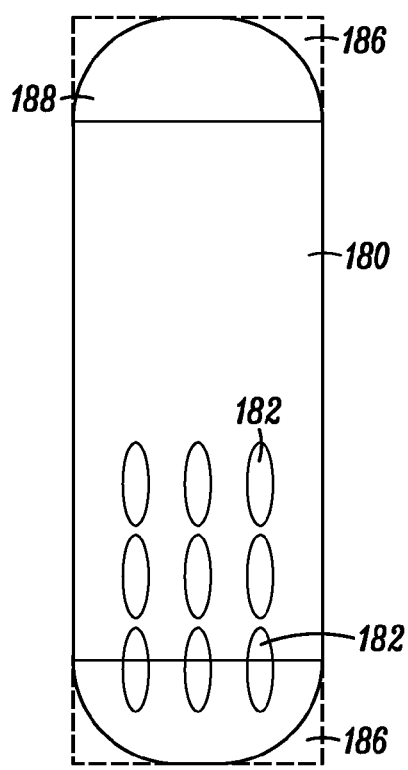
FIG. 6 is a simplified front view of an exemplary phone generally sculpted like a surfboard or skateboard with similarly shaped keys, in accordance with an embodiment of the invention.
Figure 7:
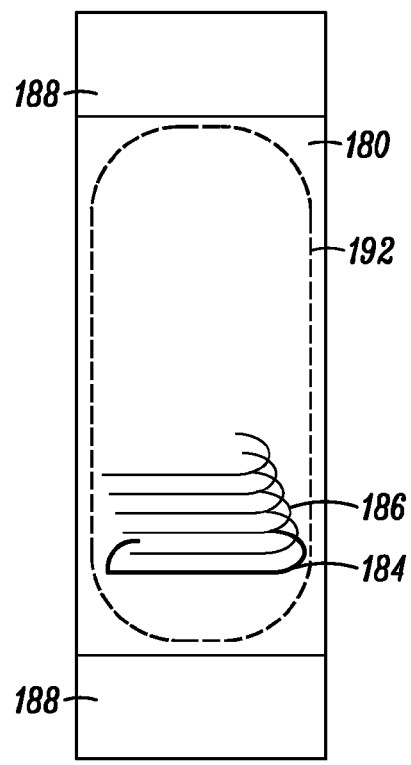
FIG. 7 is a simplified rear view of the exemplary phone generally sculpted like a surfboard or skateboard with similarly shaped keys, shown in FIG. 6, showing an integrated antenna with a wave etched into the extruded housing, in accordance with an embodiment of the invention.

In FIGS. 6 and 7, simplified front and rear views of an exemplary phone is shown, generally sculpted like a surfboard phone 180 or skateboard with similarly shaped oblong keys 182 in FIG. 6. In FIG. 7 an integrated antenna 182 with a decorative wave 184 etched or engraved into the rear extruded housing is shown. The corners 186 shown in phantom, can be easily removed, to provide a curved portion, to resemble a surfboard, for example. Additional material 188 can be included to provide a contour having varying desired thicknesses, for a desired look (similar to the extrusion shown on the right in FIG. 2).

Figure 8:
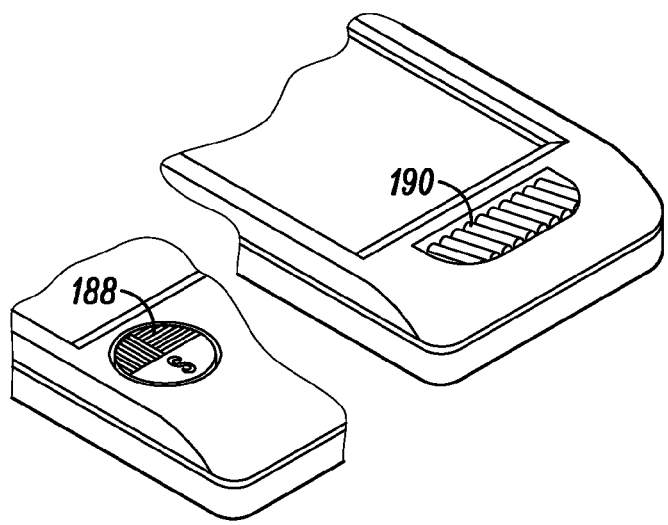
FIG. 8 is a partial view of an exemplary phone with a decorative logo on the left and circular design with an ear speaker on the right, in accordance with an embodiment of the invention.

FIG. 8 is a partial view of an exemplary phone with a decorative logo on the left and circular surface and an ear speaker on the right.

Returning to the method 100, it can further include receiving and validating the checklist of customer requirements; and making a customized wireless communication device based on the received checklist of customer requirements. This can be provided in a software program which can customize the display background, such as widgets displayed by default on the screen, alerts, etc. For example, the surf board phone can be customized to have widgets that link to weather and surf information, an alert that could signal if surf conditions exceed certain thresholds, and display background of a large wave. In this way, the customer-designer can customize the look and experience of the sculpted phone designed or ordered.

The removal step 140 can be defined at least partially by the customer requirements. In more detail, the removal step 140 can include at least one of machining, laser cutting, etching and stamping a portion of the extruded housing. For example, the removal step 140 can include forming a desired keypad construction, as shown in FIGS. 4, 5 and 6, and an antenna module, integral to the extruded housing, as shown in FIG. 10, and such optional features can be defined in the customer requirements.

In one embodiment, the removal step 140 is viewable by a customer. This feature allows a customer to watch a customized wireless communication device being made, which can include machining, laser cutting, etching and stamping a portion of the extruded housing to form the industrial design or look and feel of a wireless communication device.

In one embodiment, the inputting step 110 can be performed via a network, such as from the internet, for providing a means of inputting customer requirements from a remote location.

The customer requirements can include inputs as detailed above, and can include at least one input defining an antenna configuration and an external color. Preferably, the antenna configuration includes a pre-tested and pre-qualified antenna module, such as an integral antenna or drop-in antenna, for example.

In one arrangement, the method can include defaults, such as, providing at least one default color for the extruded housing in the customer requirements. Alternatively, the method can include an alert to the designer, highlighting that a designer has failed to enter a customer requirement, thus alerting the designer to enter or input a particular customer requirement.

In connection with customer requirements, in one embodiment, the method can include: allowing the customer requirements or designs entered by a first customer or designer to be available to a subsequent customer or designer; and crediting the first customer's account with a royalty credit, such as minutes, dollars, air time and the like, in the event a subsequent customer uses a certain threshold number of customer requirements or designs of the first customer.

Advantageously, a customer or designer can be given credits, such as minutes, in the event the customer develops a popular and attractive wireless communication device, and subsequent customers use a predetermined number of the same customer requirements entered by a first customer.

In one embodiment, the method can further include configuring a display receptacle to receive a display substantially therein, as shown in FIG. 4, for example. In another embodiment, the method can include configuring the extruded housing, for example, in a flip or slider type arrangement, as shown in FIG. 5, to connect to an external display module.

In a preferred embodiment, the method can include one or more of: configuring the extruded housing with a pocket to receive at least one of a circuit board, a battery and a subscriber identity module substantially therein; providing at least one of an antenna cover and door complementarily configured to connect to the pocket; machining vias in the extruded housing adapted to allow access from outside of the extruded housing to internally placed electrical components; and providing an integral antenna and/or antenna module in proximity to an outer periphery of the housing, as shown in FIGS. 9 and 10. The method can also include providing a coupling between the antenna module and an antenna contact point on a printed circuit board (PCB). These advantageous features can provide a narrow profile, versatile, robust and attractive wireless communication device.

In a preferred embodiment, the method can also include configuring rails in proximity to the antenna module to minimize hand effect, as shown and as detailed in FIG. 9.

Also in one embodiment, an aspect of the antenna performance can be simulated prior to the removal step 140. In more detail, the industrial design needs to be configured and designed so as not to adversely affect the RF characteristics of the antenna. The shape of the housing will have some impact on the antenna performance. Prior to the removing step 140, a simulation can be run to check the expected antenna performance with the desired input from step 110. If the performance does not meet a minimum threshold requirement, the design maybe modified to meet a certain requirement, such as a certain RF characteristic within FCC specifications, and the modification change can be presented to the user as an alternative. Performance criteria that can be simulated and can include antenna efficiency, antenna bandwidth, and antenna pattern, for example. The simulation may also include simulated head and hand affect with the wireless communication device to be built.

In one embodiment, the extruded housing is at least partially covered in a display 190, shown in phantom in FIG. 7, after the removal step. In one embodiment, the display can include E-Ink, which is an electronic flexible display technology. More information on E-Ink is available at Eink.com. The E-Ink or another flexible display technology can be applied to the housing to allow the housing color and pattern to change and contribute to the overall appearance of the end product.

In one embodiment, the method 100 can include: inputting 110 customer requirements; generating 120 and validating a checklist of customer requirements; making a customized wireless communication device based on the checklist of customer requirements, by: providing 130 an unfinished extruded housing with an opening defining a pocket configured to receive electrical components; and removing 140 material from the unfinished extruded housing to form a semi-finished extruded housing having at least one receptacle integral to the semi-extruded housing to receive an antenna module and display module.

Advantageously, this method allows a customer or designer to design and customize the look and feel or industrial design of a wireless communication device, which is beneficial and attractive to a customer. In more detail, a customer can specify or choose in the customer requirements, for example, the external design including, length, width and depth, corners and sidewalls being square or semi-circular, surface structure being smooth or with waves, rough or non-linear, type of display, such as touch screen or not, size of display, antenna module construction, etc. As should be understood by those skilled in the art, other customer requirements can be envisioned, and those listed above are exemplary.

In one embodiment, an aspect of the antenna performance is simulated prior to the removal step 140. Advantageously, this allows a design of a wireless communication device with an antenna module, to be made having acceptable RF characteristic within certain FCC requirements or specifications. Alternatively, only pre-defined antenna modules, such as integral antennas or drop-in antennas, which have been pre-tested and/or pre-qualified to be within acceptable FCC tolerances and specifications, are adapted for use in connection with the invention.

In one embodiment, an inventory of unfinished extruded housings can be located at the factory or at a customer site, such as at a phone store and the like, and a customer can watch the removal step being done at a factory via the internet or view his or her customized wireless communication device being built real time at a phone store, for example.

Shown in FIG. 9, is a perspective view from the rear of an extruded housing with an antenna module, in the form of an integral antenna 202, and in phantom, a drop-in antenna module 203, complementarily configured to be received in the extruded housing 200. As should be understood, various antenna modules can be utilized herein.

In more detail, the extruded housing 200 with an integral antenna 202 can be formed. It can include: a single substantially extrusion housing 200 having a void portion 204 and an opening 206 defining a pocket 208 adapted to receive electrical components; and the void portion 204 can be integral to the extrusion housing 200 and be configured to substantially surround and form an integral antenna 202. Alternatively, a drop-in antenna module 203, substantially complementarily configured to be at least partially received by the extruded housing 200 can be used, as shown in phantom. Advantageously, these arrangements provide a robust and simple construction that is particularly adapted to being customizable and made to a customers order, and are made in compliance with FCC specifications, to provide a customized wireless communication device designed or sculpted by a designer.

Advantageously, the extruded housing 200 forms a wireless communication device having an integral antenna 202, which is particularly adapted for mass production. In a preferred embodiment, the housing 200 and integral antenna 202 comprise substantially contiguous encompassing surfaces on an outer periphery 236 of the housing 200, to enclose and surround electrical components on a plurality of sides, and the integral antenna 202 is formed from portions of the housing 200 material.

In a preferred embodiment, the housing 200 and integral antenna 202 comprise a conductive material configured to form at least one antenna. The conductive material can comprise aluminum, for providing desirable antenna characteristics and for providing a desirable ground.

In a preferred embodiment, the removal step 240 can include: forming a desired antenna construction, key pad construction and display opening integral to the extrusion housing. Thus, in this embodiment, keys with voids substantially surrounding three sides of each key and an opening for a display can be formed at the same time and in a substantially similar manner to the way the integral antenna 202 is formed, as detailed herein.

In yet more detail, the integral antenna 202 includes isolated portions of the extruded housing 200 such that the isolated portions help to form the integral antenna 202 geometry, thus providing the desired radio frequency characteristics. This can be accomplished by isolating the integral antenna 202 from the remainder of the housing 200 by at least one void portion 204 in the continuous housing 200. In one embodiment, there can be a plurality of voids in the housing 200 surrounding the one or more antennas.

In this embodiment, the integral antenna 202 is formed into the extrusion housing 200 such that a portion of the housing 200 is isolated from the antenna 202 and a portion of the housing can comprise a ground. The integral antenna 202, in this embodiment, can be formed by creating a void portion 204 in the material of the continuous housing 200. The void portion 204 creates the desired antenna shape or geometry, which in one embodiment can be a dipole antenna. The antenna shape, including the length, width and geometry determines the radio frequency operating bandwidth. For example, the antenna length and geometry can be made to operate in any desired band, and in one embodiment is formed to operate in an 800 MHz frequency band of a cellular radiotelephone system. As should be understood, the antenna module 203, including for example, the integral antenna 202 or drop-in antenna shown in phantom, can be formed, for different frequency bands, if desired. The antenna module 203 can include a first leg 210 configured to be connected to a printed circuit board and a second leg 212 connectable to a ground, for example, provided by the extruded housing 200.

As best shown FIG. 9, in one embodiment, the extruded housing 200, can be a generally rectangularly shaped, narrow profile housing with a side opening 206 forming a pocket 208 to receive electronic components. As should be understood by those skilled in the art, however, there may be a plurality of sides having integral antenna(s). Alternatively for example, the housing 200, as shown in FIG. 10, can have two sides, such as front and rear faces 218 and 220 with semi-circular interfaces or walls 222, 224 and 226 that meet to form an enclosure, i.e. a front 218 and a rear face 220 only. The outer periphery may be flat, non planar or a combination thereof, depending on the desired aesthetics and look and feel.

As shown in FIGS. 9 and 10, the antenna module 203 is strategically placed in proximity to a bottom portion 216 of the housing 200. Advantageously, this location is chosen to provide the antenna to be minimally interfered with, by a user's hands and body, for improved RF communications.

The housing 200 in FIG. 10 includes a front face (or wall) 218, a rear face (or wall) 220, a north wall 222, a west wall 224, an opening 206 on an east side and a south wall 226, which collectively form an open sided housing forming a pocket 208 adapted to receive electrical components. The housing 200 in FIG. 10 also shows a narrow profile construction including a battery compartment 250 for receipt of a battery, a daughter PCB and SIM card location 252 for receipt of such components, ear piece speaker 254, display 256, key pad module 258 including a PCB, metal stiffener, EL and domes, and a loud speaker chamber 260. This construction provides an attractive wireless communication device, such as a cellphone.

As should be understood, the matter set forth in the foregoing description and accompanying drawings is offered by way of illustration only and not by limitation. While particular embodiments have been shown and described, it will be apparent to those skilled in the art that changes and modifications may be made without departing from the broader aspects of Applicant's invention.

What is claimed is:

1. A method of making a customized wireless communication device comprising:
inputting customer requirements including desired hardware and software features, the software features including:
choosing a display background,
identifying a specified widget to be loaded, and
choosing a specified application;
generating a checklist of customer requirements;
providing an extruded housing with an opening defining a pocket configured to receive electrical components; and
removing material from the extruded housing to form a desired sculpted industrial design and to form at least one receptacle in the extruded housing to receive an antenna module and display module, wherein the removal step is viewable by a customer.

2. The method of claim 1 further comprising: receiving the checklist of customer requirements; and making a customized wireless communication device based on the received checklist of customer requirements.

3. The method of claim 1 wherein the removal step is defined by the customer requirements.

4. The method of claim 1 wherein the inputting is performed via a network.

5. The method of claim 1 wherein the removal step is viewable by a customer via a network connection or at a store.

6. The method of claim 1 wherein the customer requirements include at least one input defining an antenna configuration and an external color.

7. The method of claim 1 further comprising: configuring the extruded housing to receive an external display module in the wireless communication device.

8. The method of claim 1 further comprising: configuring the pocket to receive at least one of a circuit board, a battery and a subscriber identity module substantially therein.

9. The method of claim 1 further comprising: configuring the display receptacle to receive a display substantially in the wireless communication device.

10. The method of claim 1 wherein the removal step further includes forming a desired keypad construction in the extruded housing.

11. The method of claim 10 wherein the keypad construction is defined by the customer requirements.

12. The method of claim 1 wherein the removal step includes at least one of machining, laser cutting and stamping a portion of the extruded housing.

13. The method of claim 12 wherein the removal step is viewable by a customer via a network connection or at a store.

14. The method of claim 1 further comprising: providing at least one of an antenna cover and door complementarily configured to connect to the pocket.

15. The method of claim 1 further comprising: machining vias in the extruded housing adapted to allow access from outside of the extruded housing to internally placed electrical components.

16. The method of claim 1 wherein the antenna module includes providing an integral antenna in proximity to an outer periphery of the housing.

17. The method of claim 16 wherein an aspect of the antenna performance is simulated prior to the removal step.

18. The method of claim 1 wherein the customer requirements include at least one of: choosing a display background, identifying a widget to be included in the handset, and preloading the device with a user specified application.

19. The method of claim 1 wherein allowing the customer requirements entered by a first customer to be available to a subsequent customer.

20. The method of claim 19 wherein crediting the first customer's account in the event a subsequent customer uses the customer requirements of the first customer.

21. The method of claim 1 wherein at least a portion of the housing is covered with a display comprising E-ink after the removal step.

22. The method of claim 21 wherein the display covering includes at least a portion of the housing being set to display an image chosen by the requirements.

23. The method of claim 21 further comprising providing at least one default color for the extruded housing in the customer requirements.

24. A method of making a customized wireless communication device comprising:
inputting customer requirements including desired hardware and software features, the software features including:
choosing a display background,
identifying a widget to be loaded, and
preloading the device with a user specified application;
generating a checklist of customer requirements;
making a customized wireless communication device based on the received checklist of customer requirements, by:
providing an extruded housing with an opening defining a pocket configured to receive electrical components;
removing material of the extruded housing to form a desired sculpted industrial design and to form at least one receptacle in the extruded housing to receive an antenna module and display module, wherein the removal step is viewable by a customer via a network connection or at a store; and covering at least a portion of the housing with a display comprising E-ink after the removal step.

25. The method of claim 24 further comprising: populating the pocket with electronic components including at least one of a circuit board, a battery and a subscriber identity module substantially therein.

26. The method of claim 24 wherein the removing step further includes forming a desired keypad construction integral to the extruded housing.

27. The method of claim 24 wherein the removing step includes at least one of machining, laser cutting and stamping a portion of the extruded housing.

28. The method of claim 24 further comprising: providing at least one of an antenna cover and door configured to connect to the pocket.

29. The method of claim 24 further comprising: providing a coupling between the antenna module and an antenna contact point on a printed circuit board (PCB).

* * * * *